(12) United States Patent
Hernandez (10) Patent No.: US 12,277,257 B2
(45) Date of Patent: Apr. 15, 2025

(54) CACHE CODE FOR AN ELECTRONIC PAYMENT TERMINAL AND CORRESPONDING ELECTRONIC PAYMENT TERMINAL

(71) Applicant: BANKS AND ACQUIRERS INTERNATIONAL HOLDING, Paris (FR)

(72) Inventor: Vincent Hernandez, Claveyson (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 593 days.

(21) Appl. No.: 17/416,165

(22) PCT Filed: Dec. 10, 2019

(86) PCT No.: PCT/EP2019/084478
§ 371 (c)(1),
(2) Date: Jun. 18, 2021

(87) PCT Pub. No.: WO2020/126691
PCT Pub. Date: Jun. 25, 2020

(65) Prior Publication Data
US 2022/0075905 A1    Mar. 10, 2022

(30) Foreign Application Priority Data

Dec. 20, 2018 (FR) .................................. 1873653
Feb. 12, 2019 (FR) .................................. 1901408

(51) Int. Cl.
*G06F 21/83* (2013.01)
*F16B 21/09* (2006.01)
(Continued)

(52) U.S. Cl.
CPC .............. *G06F 21/83* (2013.01); *F16B 21/09* (2013.01); *G06F 3/02* (2013.01); *G06F 3/0202* (2013.01);
(Continued)

(58) Field of Classification Search
CPC .......... G06F 3/0202; G06F 3/02; G06F 21/34; G06F 21/83; G06F 21/31; F16B 21/09;
(Continued)

(56) References Cited

U.S. PATENT DOCUMENTS

2018/0306378 A1  10/2018  Carpenter et al.
2019/0378104 A1* 12/2019  Winsor .................. G07F 11/38
2020/0398759 A1* 12/2020  König ..................... B60R 11/04

FOREIGN PATENT DOCUMENTS

CN      205644831 U   10/2016
FR        2910084 A1    6/2008

OTHER PUBLICATIONS

International Search Report and Written Opinion dated Feb. 17, 2020 for International Application No. PCT/EP2019/084478, filed Dec. 10, 2019.
(Continued)

*Primary Examiner* — Cheng-Feng Huang
(74) *Attorney, Agent, or Firm* — David D. Brush; Westman, Champlin & Koehler, P.A.

(57) ABSTRACT

A removable cache code intended to be assembled to an electronic payment terminal in a reversible manner, thanks to first and second reversible attachment means located on the outer face of at least one of the lateral walls of the cache code.

8 Claims, 8 Drawing Sheets

(51) Int. Cl.
    *G06F 3/02*     (2006.01)
    *G06F 21/34*     (2013.01)
    *G07F 7/10*     (2006.01)
    *G06F 21/31*     (2013.01)

(52) U.S. Cl.
    CPC ............ *G06F 21/34* (2013.01); *G07F 7/1016* (2013.01); *G07F 7/1033* (2013.01); *G06F 21/31* (2013.01)

(58) Field of Classification Search
    CPC ...... F16B 21/00; F16B 5/0088; G07F 7/1016; G07F 7/1033; G07F 7/10
    See application file for complete search history.

(56) References Cited

OTHER PUBLICATIONS

English translation of the Written Opinion dated Feb. 17, 2020 for International Application No. PCT/EP2019/084478, filed Dec. 10, 2019.
Verifone: "MX 900 Series Installation Guide", Mar. 1, 2012 (Mar. 1, 2012), XP055639307.
Verifone: "VeriFone Nurit 8400 Installation Guide", Dec. 31, 2009 (Dec. 31, 2009), XP055639299.
Verifone: "VeriFone Part No. 23216, Revision E", Nov. 9, 2008 (Nov. 9, 2008), XP055639304.

\* cited by examiner

CACHE CODE FOR AN ELECTRONIC PAYMENT TERMINAL AND CORRESPONDING ELECTRONIC PAYMENT TERMINAL

CROSS-REFERENCE TO RELATED APPLICATIONS

This Application is a Section 371 National Stage Application of International Application No. PCT/EP2019/084478, filed Dec. 10, 2019, which is incorporated by reference in its entirety and published as WO 2020/126691 A1 on Jun. 25, 2020, not in English.

1. FIELD OF THE INVENTION

The present technique relates to the field of electronic payment terminals and more particularly to the field of securing their use, via the implementation of a code shield making it possible to secure the entry of the confidential code of the user.

2. PRIOR ART

It is known to implement a code shield on an electronic payment terminal so that the user can enter their confidential code securely, that is to say by limiting the visibility by an ill-intentioned person, of the keys of the keypad of the electronic payment terminal. Such code shields are most often implemented via a plastic part comprising three walls making it possible to hide the keypad of the electronic payment terminal on three of its sides, the last side enabling the user to access the keys of the keypad.

However, the attachment of such a code shield on an electronic payment terminal is often made tricky due to its geometry and the fact that such a plastic part is not always sufficiently shaped correctly to enable a correct resistance over time.

Several attachment techniques currently exist, (such as screwing, bonding or also clipping) each having drawbacks.

Thus, screwed or bonded code shields are not removable.

For example, screwed code shields are assembled in the factory, because the screwing must be implemented from the inside of the electronic payment terminal. A screwed code shield therefore may not be installed on its place of use and may not be removed if the merchant so desires.

By definition, bonded code shields are not removable and what is more are difficult to install. They may be installed on their place of use, but their attachment requires precautions and skill. In addition, the attachment of such a code shield, by bonding, may degrade over time, according to the conditions of use of the electronic payment terminal on which it is bonded.

By definition, clipped code shields are removable, and therefore may be installed and removed on their place of use, but their resistance is heavily dependent on the good geometry of the code shield. Indeed, as already indicated above, a code shield is most often reduced to three walls the moulding of which is difficult to control, and the imprecision of the dimensions of a code shield also often makes the attachment by clips imprecise and therefore inefficient.

Therefore, there is a need for a technique for removable attachment of a code shield on an electronic payment terminal that is reliable and easy to implement.

3. DISCLOSURE OF THE INVENTION

The present technique proposes an ergonomic and simple means for overcoming the drawbacks of solutions of the prior art, via a removable code shield intended to be assembled in a reversible manner on an electronic payment terminal and comprising at least one so-called lateral wall and one so-called rear wall. According to the present invention, the code shield has, on the outer face of the at least one lateral wall, first and second reversible attachment means of the code shield intended to cooperate with corresponding means in a receiving location of the electronic payment terminal and the first reversible attachment means are formed by at least one excrescence extending obliquely in relation to the plane of the outer face of the lateral wall.

Thus, the technique presented proposes a novel and inventive solution for attaching the code shield, obtained by means of specific shapes of the attachment means the relative arrangements of which enable the conformation of the code shield, its holding in position on the electronic payment terminal, while enabling dismantling without damaging the parts (code shield and electronic payment terminal).

Thus, the first reversible attachment means, for example formed by an excrescence on the outer face of a lateral wall of the code shield, make it possible, thanks to their inclination in relation to this outer face of the wall that supports them, to force the code shield in a position as close as possible to the walls of the receiving location formed by the upper cover of the electronic payment terminal.

Moreover, the second reversible attachment means, formed for example by an excrescence positioned for its part perpendicular to the outer face of the lateral wall of the code shield, make it possible to stabilise the code shield in its position by preventing it from moving backwards.

According to a particular aspect of the present technique, such a code shield has two lateral walls each having the first and second reversible attachment means.

For example, the excrescence forming the first reversible attachment means has a shape of the type:
  dovetail,
  keyhole,
  T-shape.

Thus, regardless of the shape of the section of the excrescence, this should have a bulge that ensures the holding in the receiving location of the electronic payment terminal and an oblique insertion.

The present technique also relates to an electronic payment terminal configured to receive such a code shield.

Thus, such an electronic payment terminal comprises a location for receiving a code shield, this receiving location comprising at least one so-called lateral wall and one so-called rear wall, the at least one lateral wall having on its inner face first receiving means intended to cooperate with the first reversible attachment means of the code shield and second receiving means intended to cooperate with the second reversible attachment means of the code shield.

The location for receiving the code shield is formed by the upper cover of the electronic payment terminal, extending vertically on each side and at the rear of the keypad of the electronic payment terminal.

4. LIST OF FIGURES

These features, as well as others, will become more apparent upon reading the following description of one embodiment, given by way of simple illustrative and non-limiting example, and the appended figures, wherein.

5. DESCRIPTION OF AN EMBODIMENT OF THE INVENTION

5.1. General Principle

The general principle of the present technique resides in the presence of two distinct means for attaching the code shield on the electronic payment terminal, provided on the outer faces of the code shield, in order to cooperate with corresponding receiving means on the inner faces of the receiving location provided on the electronic payment terminal. The two distinct attachment means each make it possible to obtain a distinct technical effect, in such a way as to ensure a reversible but resistant assembly of a code shield on an electronic payment terminal.

Thus, the first reversible attachment means, formed by an excrescence extending obliquely over the outer face of at least one of the lateral walls of the code shield, make it possible to force the code shield into its assembled position, that is to say hold it as close as possible to the walls of the receiving location of the electronic payment terminal. This makes it possible to correct a known deformation defect of the code shield, due to its manufacture by moulding and to its shape with three walls only. Indeed, this U-shape has quite a rigid rear portion whereas the lateral walls are quite flexible and tend to tighten and therefore to move closer to one another, which makes durable assembly on an electronic payment terminal difficult.

This technical effect of lateral holding of the code shield assembled to the electronic payment terminal is therefore obtained both by the fact that this concerns an excrescence (for example a pin) as well as by the oblique feature of this excrescence, which requires an oblique insertion into the corresponding receiving means of the electronic payment terminal.

A plurality of examples of shape of this excrescence (dovetail type shape, or keyhole, or T-shape) are described in more detail hereafter, but it should be remembered that regardless of the shape of the section of this excrescence, this should have a bulge that ensures the holding in the receiving location and an oblique insertion.

In addition, the second reversible attachment means enable the longitudinal holding of the code shield by preventing it from moving backwards and by preventing the first reversible attachment means from coming out of the corresponding receiving means on the electronic payment terminal.

Thus, the proposed solution makes it possible to obtain a code shield that may be assembled on its place of use (for example by a merchant), by anyone, without tools or particular preparation. The mounting remains reversible, (as opposed to bonding or screwing), and the code shield may be reinstalled if necessary after being dropped or dismantled for cleaning the terminal. This method enables the installation on site, by people who are not necessarily trained (customers) and enables a solid and durable, but reversible, attachment.

Finally, to remove the code shield, a lateral pressure should be exerted on the rear portion of the code shield and the code shield should be slid forwards. The combination of this lateral pressure and of this movement thus makes it possible to reduce the risks of untimely dismantling.

5.2. Description of a First Embodiment

Figure 1:
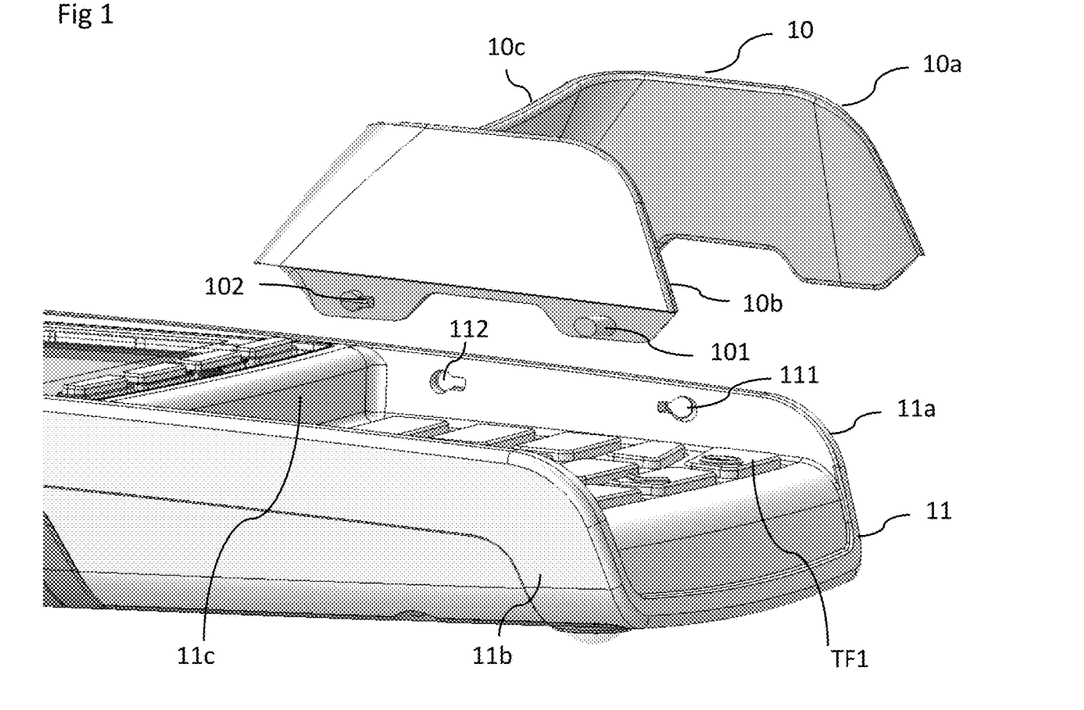
FIG. 1 illustrates an example of code shield and of electronic payment terminal according to a first embodiment, the code shield not being assembled to the electronic payment terminal.
Figure 2:
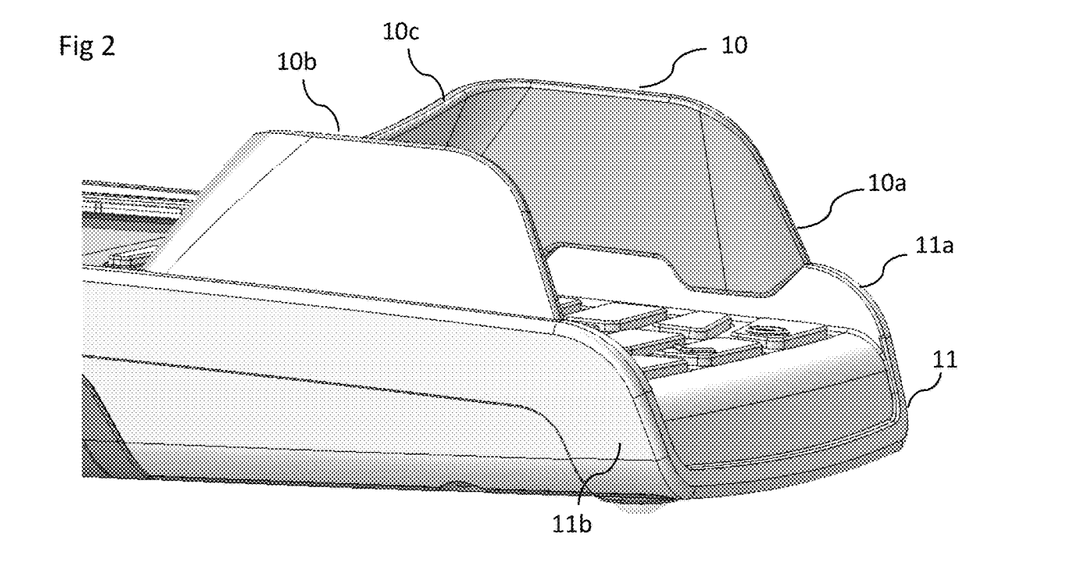
FIG. 2 illustrates the example of code shield of [FIG. 1] assembled to the electronic payment terminal of [FIG. 1]

It is now presented in more detail a first embodiment of a code shield 10 and of an electronic payment terminal 11 intended to be assembled, as illustrated for example in [FIG. 1] and [FIG. 2].

The reversible attachment points of the code shield 10 on the electronic payment terminal 11 are located on the lateral walls (11a, 11b) of the upper cover of the electronic payment terminal 11, in areas away from the sensitive portions of the terminal, such as for example the chip card read head or certain electronic components. Thus, this makes it possible to limit the covering of sensitive areas by the code shield and therefore limit the possibilities of using the code shield to hide possible fraud devices, such as for example chip card reader spying devices.

In addition, as already indicated above, the principle of the technique proposed is based on the fact that the front portion of the code shield, which is the most flexible and the most easily deformable, includes first reversible attachment means 101 of the code shield 10 in the location provided on the electronic payment terminal 11, enabling the lateral holding of the code shield on the electronic payment terminal.

According to this first embodiment, these first reversible attachment means 101 take the shape of cylindrical oblique anchors of keyhole type that make it possible, through translation, to bring the flexible/deformable lateral walls (10a, 10b) of the code shield 10 in the desired position, then hold it in this position when the code shield is completely assembled to the electronic payment terminal. Indeed, this excrescence shape requires a particular oblique insertion of the code shield and enables an optimum lateral holding, as opposed to an excrescence perpendicular to the wall of the code shield that would not make it possible to hold the latter in its assembled position because of the flexibility of the lateral walls and of their tendency to tighten.

Reversible attachment means of keyhole type are easy to produce (simple shape, cylindrical drilling) and make it possible to support moderate attachment loads.

Second reversible attachment means 102 are also provided, for example in the form of lugs located on the rear portion of the lateral walls (10a, 10b) of the code shield 10, where the part is less flexible (due to the rear wall 10c that reinforces this portion of the code shield). At the end of translation of the code shield along the walls (11a, 11b) of the receiving location of the electronic payment terminal 11, these second reversible attachment means 102 fit into cavities arranged 112 in the upper cover, on each of the inner lateral walls (11a, 11b) of the receiving location.

Figure 10A:
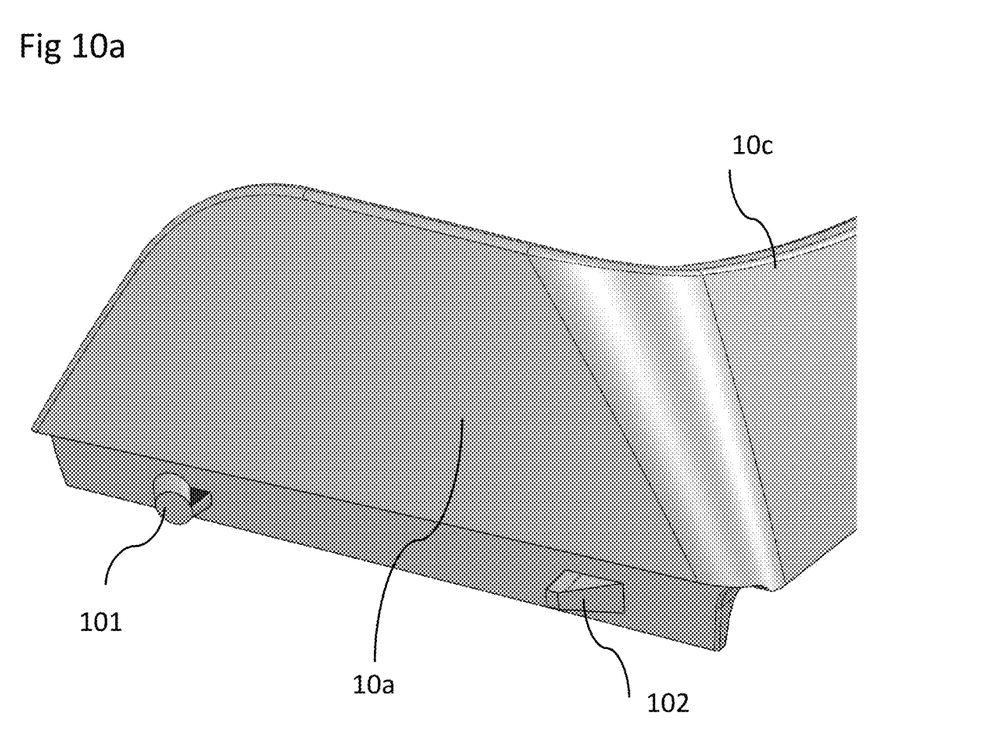
FIG. 10a illustrates a first view of second reversible attachment means according to an alternative embodiment.
Figure 10B:
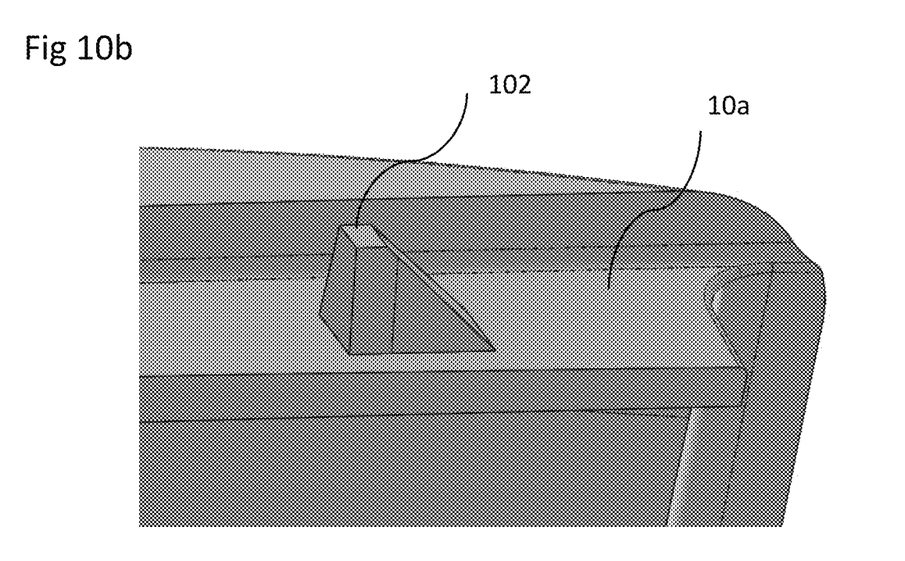
FIG. 10b illustrates a second view, from the top, of second reversible attachment means according to the alternative embodiment.
Figure 10C:
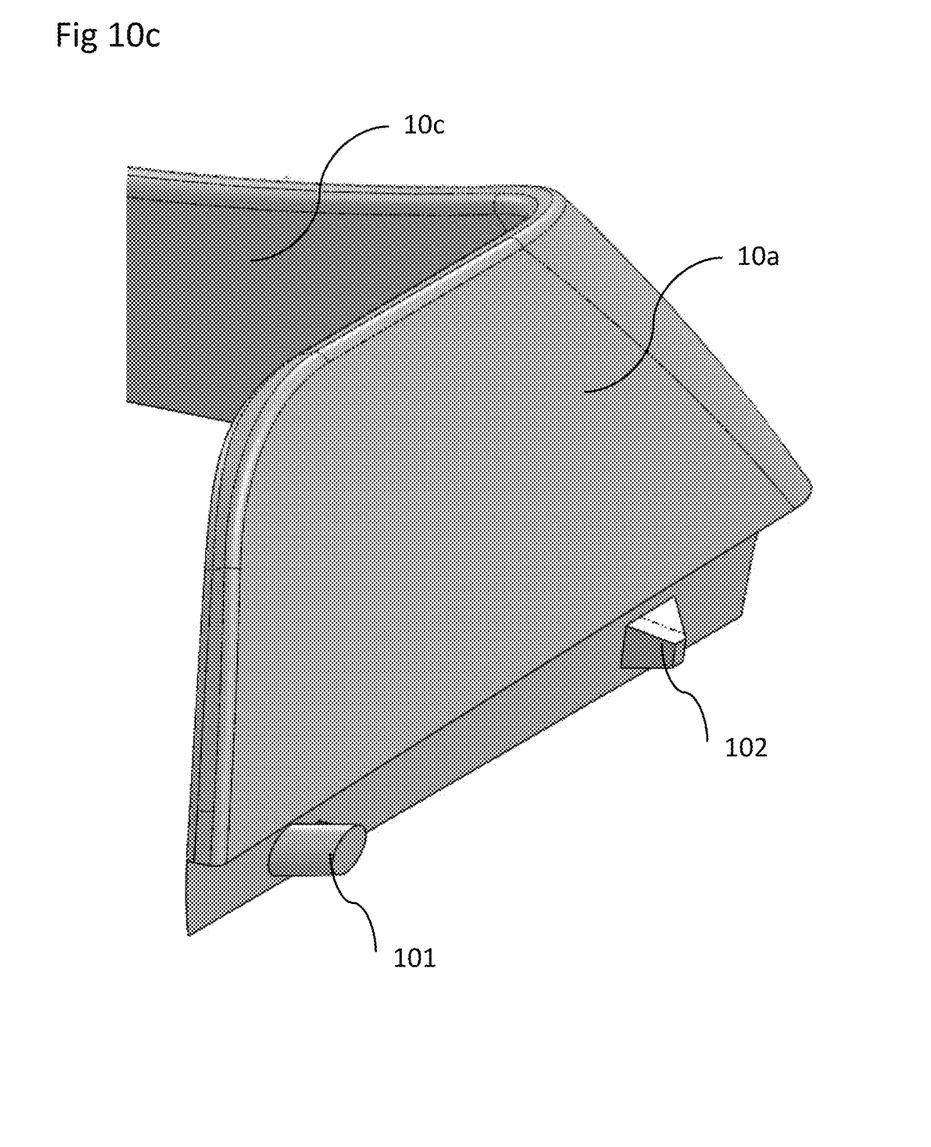
FIG. 10c illustrates a third view of second reversible attachment means according to the alternative embodiment.

In this way, once inserted and attached in the receiving location, the code shield can no longer move backwards, and the oblique anchors 101 cannot come out of their housing. Any shape of the second reversible attachment means may be envisaged from the moment it enables the longitudinal holding of the code shield in assembled position, while enabling the insertion of the first reversible attachment means into the corresponding locations. For example, [FIG. 10a], [FIG. 10b] and [FIG. 10c] illustrate a plurality of views of these second reversible attachment means 102 according to another alternative embodiment. According to this alternative, this concerns triangular-shaped lugs. This shape of the second reversible attachment means 102 is compatible with all of the shapes of the first reversible attachment means, and vice versa.

Figure 3:
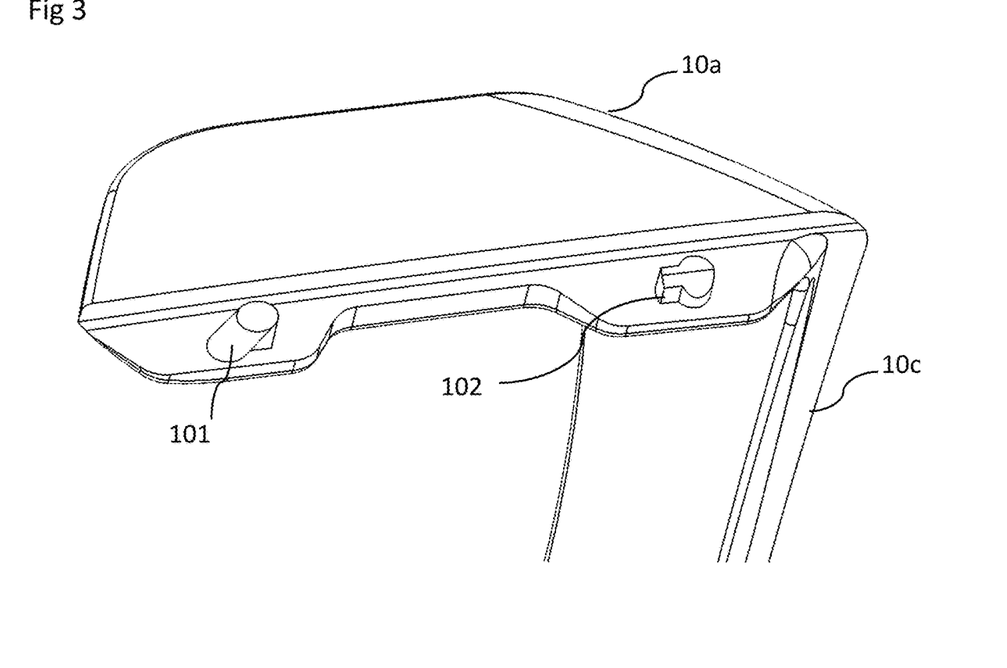
FIG. 3 illustrates the example of code shield of [FIG. 1] and of reversible attachment means, according to a first embodiment.

FIG. 3 illustrates a bottom view of a portion of the code shield of [FIG. 1], here the outer lateral wall 10a and a portion of the inner rear wall 10c. The lateral wall 10a therefore has first reversible attachment means 101 and second reversible attachment means 102, according to this first embodiment.

Figure 4:
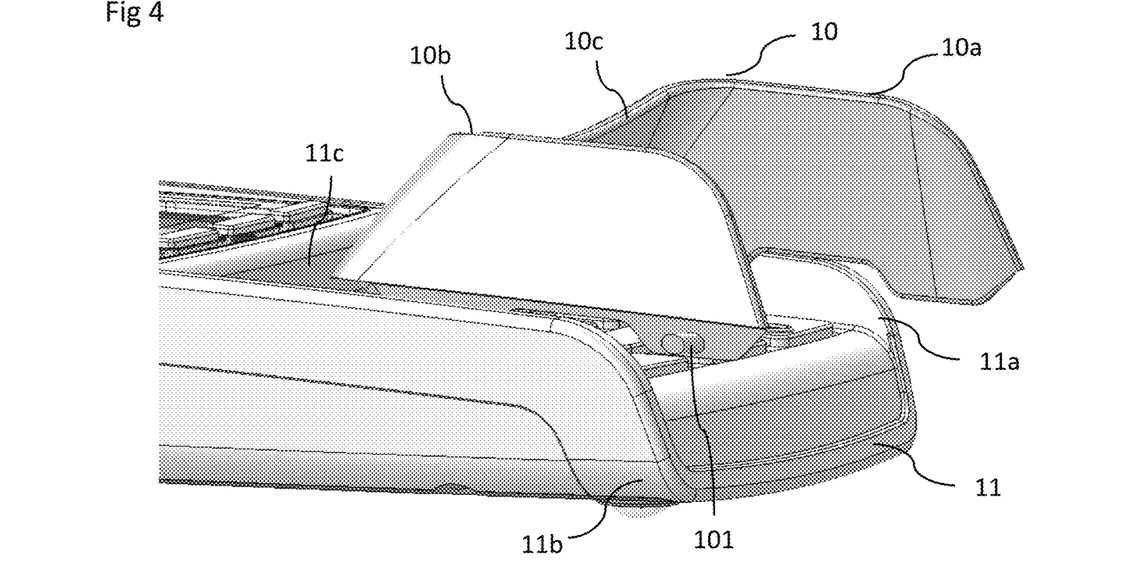
FIG. 4 illustrates the example of code shield of [FIG. 1] and the example of electronic payment terminal of [FIG. 1], in a first assembly position.
Figure 5A:
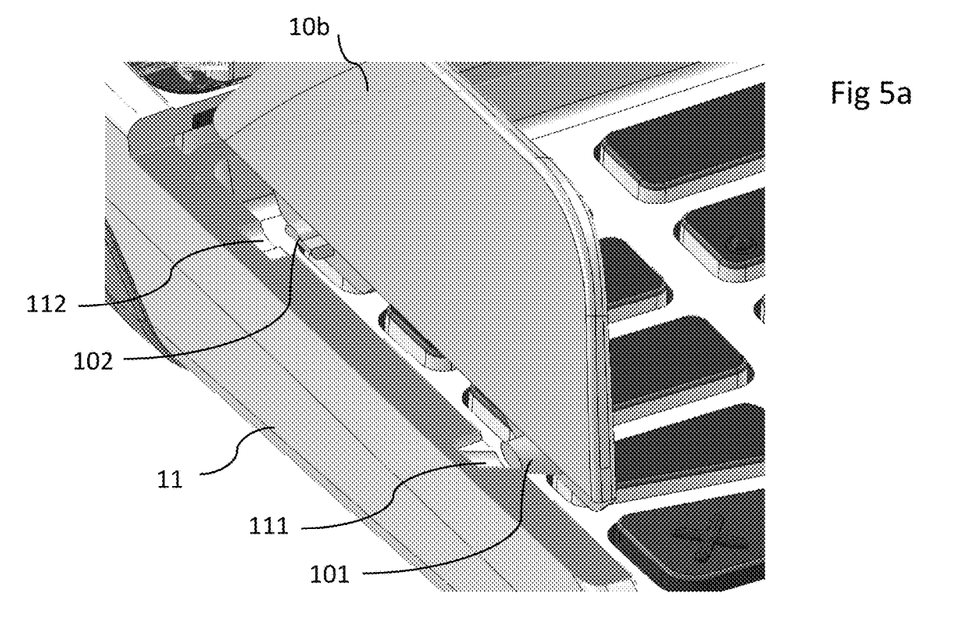
FIG. 5a illustrates the example of code shield of [FIG. 1] and the example of electronic payment terminal of [FIG. 1] according to a sectional view, in a second assembly position.
Figure 5B:
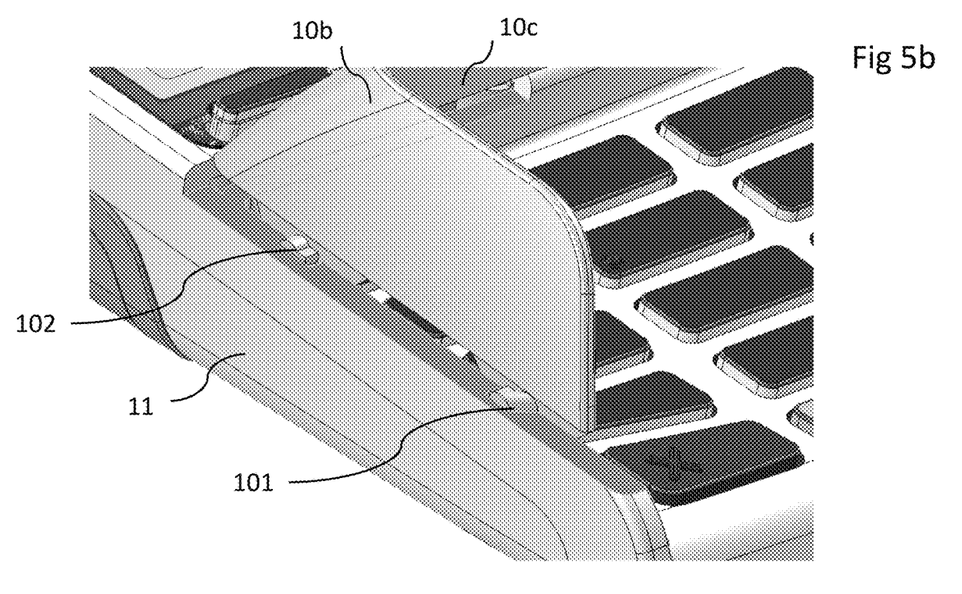
FIG. 5b illustrates the example of code shield of [FIG. 1] and the example of electronic payment terminal of [FIG. 1] according to a sectional view, in a third assembly position.

Figures [FIG. 4], [FIG. 5a] and [FIG. 5b] illustrate various assembly positions of a code shield and of an electronic payment terminal according to this first embodiment.

Thus, it can be observed in [FIG. 4] the code shield 10 in a first assembly position on the electronic payment terminal 11, wherein the first reversible attachment means 101 are not yet inserted into the corresponding receiving means of the electronic payment terminal 11.

Figures [FIG. 5a] and [FIG. 5b], make it possible thanks to sectional views to illustrate respectively a second and a third assembly position of the code shield 10 on the electronic payment terminal 11.

In the second assembly position ([FIG. 5a]), the first reversible attachment means 101 and the second reversible attachment means 102 are located opposite the corresponding receiving means, respectively 111 and 112, of the electronic payment terminal 11, in such a way as to be inserted therein. In this second assembly position, it is noted that the code shield is also positioned above the electronic payment terminal, and slightly advanced in relation to its attachment position. Indeed, as already indicated, the assembly movement takes place from front to back, so as to be able to insert particularly the first reversible attachment means 101 obliquely into the receiving means 111, in order to obtain the desired technical effect of lateral holding of the code shield assembled to the electronic payment terminal.

The third assembly position ([FIG. 5b]) shows the first reversible attachment means 101 and the second reversible attachment means 102 inserted into the corresponding receiving means, respectively 111 and 112, of the electronic payment terminal 11, in such a way as to attach the code shield on the electronic payment terminal. It is also seen in this [FIG. 5b] that the code shield comes into abutment, via its rear wall 10c, on the rear wall 11c (best seen in [FIG. 1]) of the receiving location on the electronic payment terminal. Thus, the second technical effect of longitudinal holding of the code shield assembled to the electronic payment terminal is obtained correctly, thanks to the second reversible attachment means 102 inserted into the corresponding receiving means 112.

Figure 6:
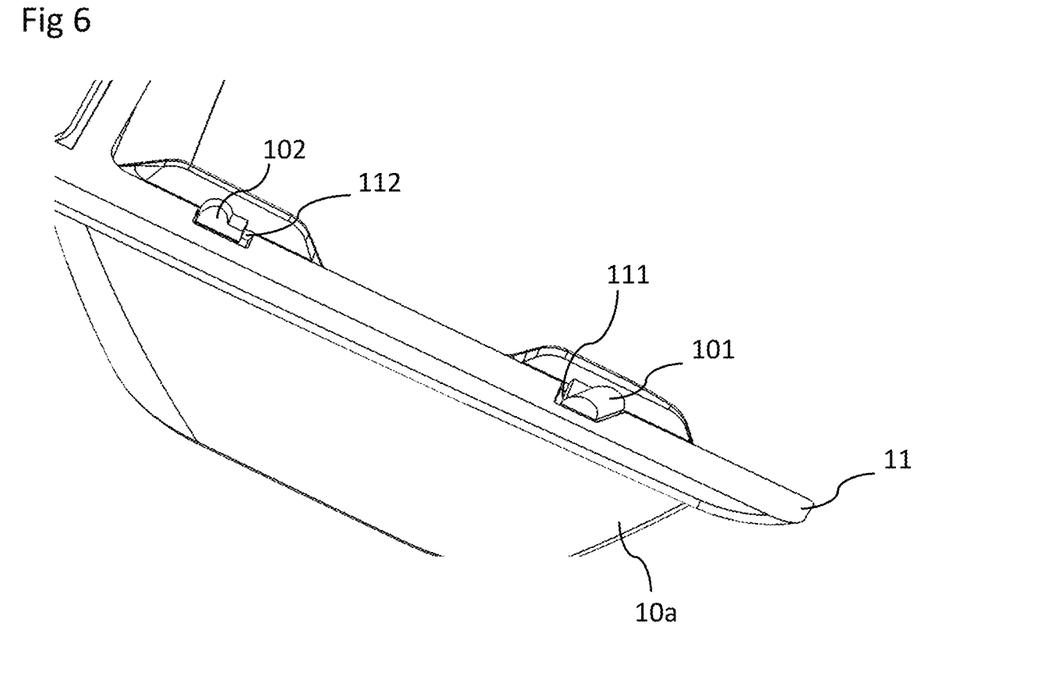
FIG. 6 illustrates a sectional view of the code shield of [FIG. 1] assembled to the electronic payment terminal of [FIG. 1], according to the first embodiment.

FIG. 6 illustrates, according to another sectional view (the code shield unit assembled to the electronic payment terminal being turned over in relation to a use position), the code shield assembled to the electronic payment terminal, the first and second reversible attachment means 101, 102 being inserted respectively into the corresponding receiving locations 111, 112 of the electronic payment terminal.

Finally, as already indicated above, to remove the code shield, a lateral pressure should be exerted on the rear portion of the code shield, in such a way as to make the attachment means 102 come out of the corresponding receiving means 112, as well as the attachment means 101 come out of the corresponding receiving means 111, and the code shield should be slid forwards. The combination of this lateral pressure and of this movement makes it possible to reduce the risks of untimely dismantling.

5.3. Description of a Second Embodiment

Figure 7A:
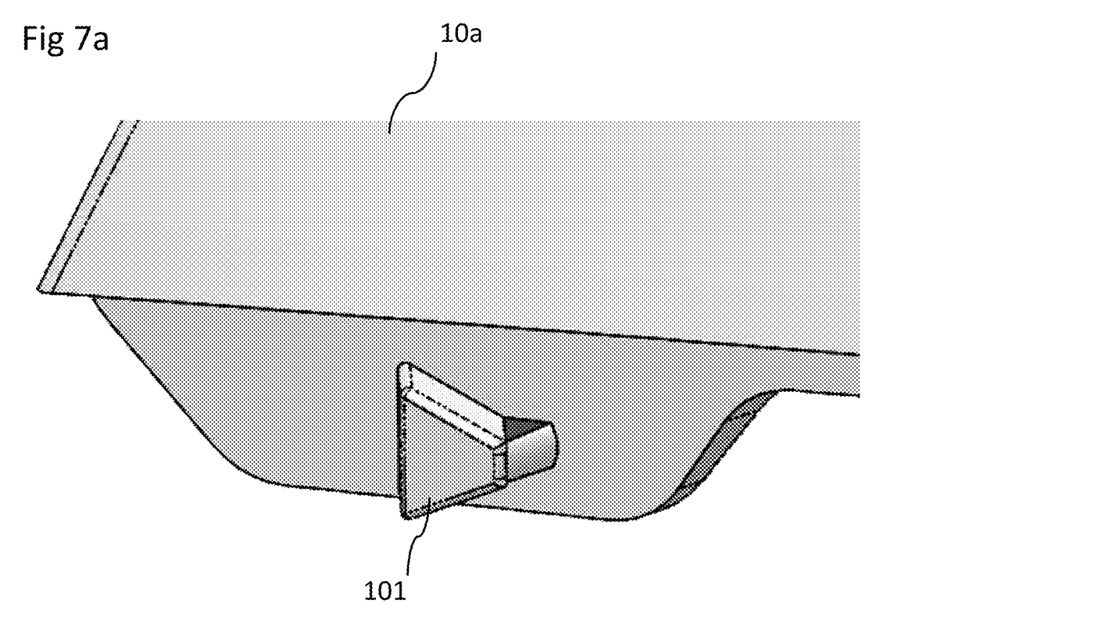
FIG. 7a illustrates an example of first reversible attachment means of a code shield, according to a first view of a second embodiment.
Figure 7B:
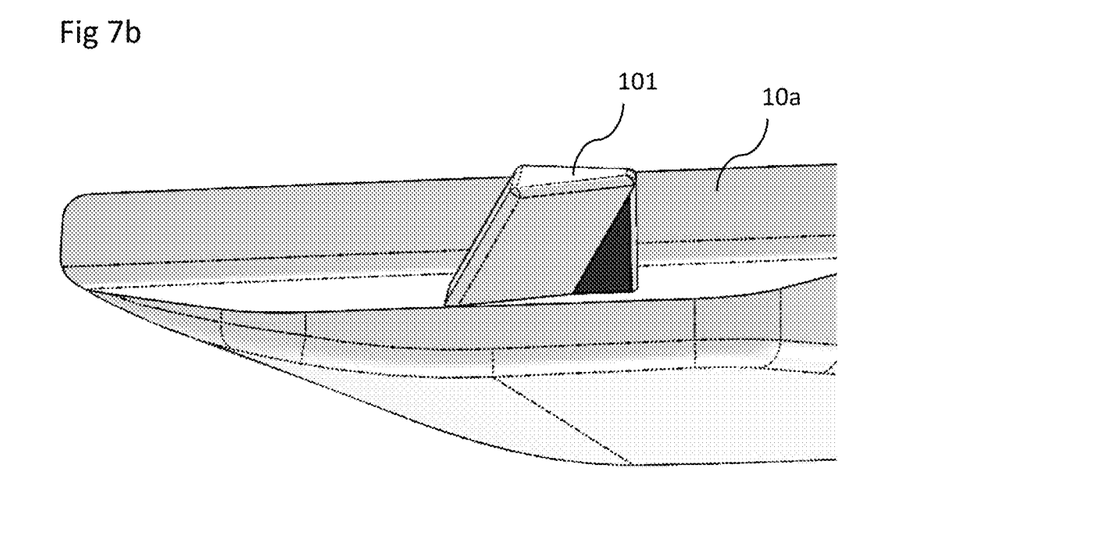
FIG. 7b illustrates a bottom view of the first reversible attachment means of the example of [FIG. 7a]
Figure 8A:
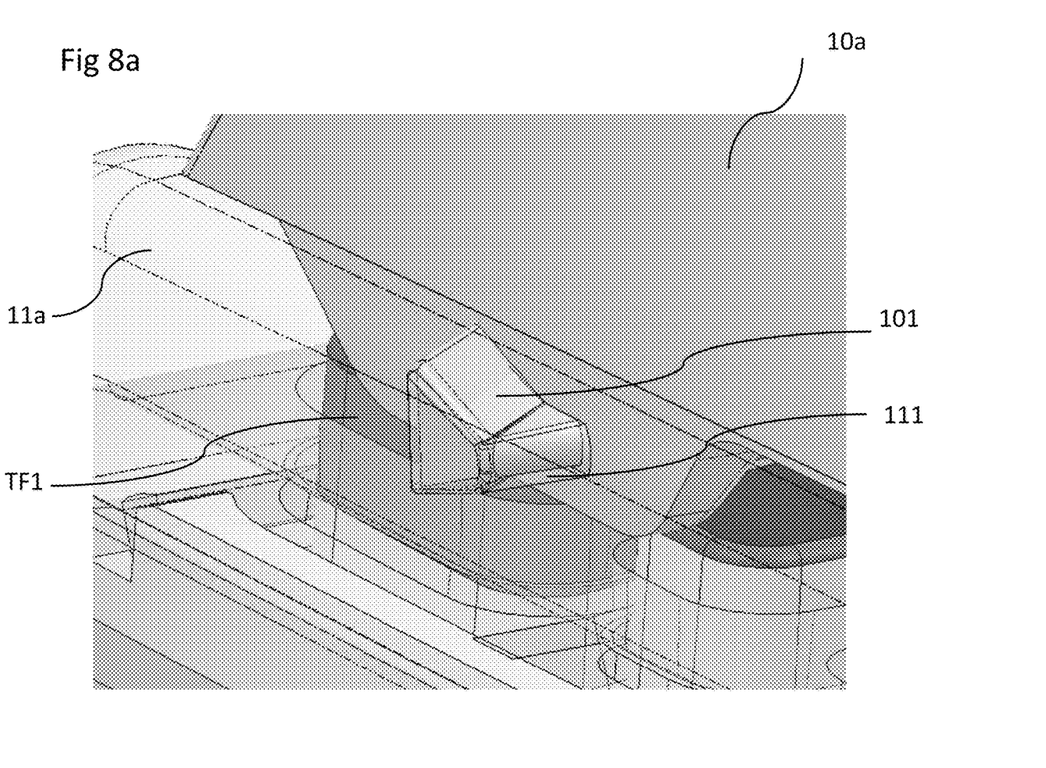
FIG. 8a illustrates a transparent view of the outside of a code shield assembled to an electronic payment terminal according to the second embodiment.
Figure 8B:
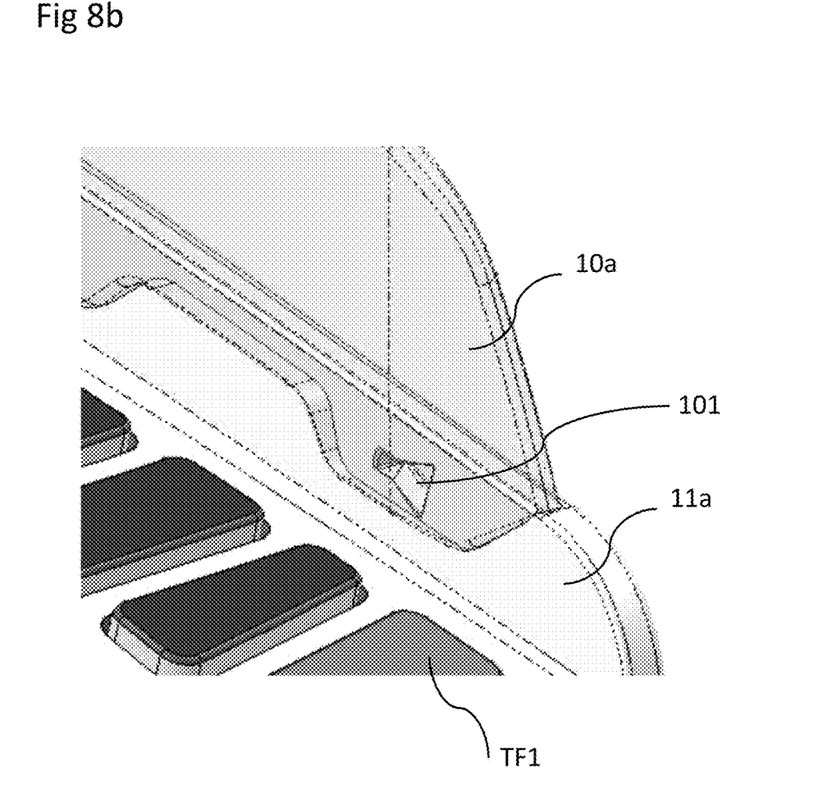
FIG. 8b illustrates a transparent view of the inside of a code shield assembled to an electronic payment terminal according to the second embodiment.

It is now presented in more detail a second embodiment of a code shield 10 ([FIG. 7a] and [FIG. 7b]) and of an electronic payment terminal 11 intended to be assembled (assembly illustrated for example in [FIG. 8a] and [FIG. 8b]).

In this second embodiment, the shape of the first reversible attachment means 101 is different and corresponds to a dovetail type shape, making it possible to ensure the lateral holding of the code shield in the corresponding location on the electronic payment terminal thanks to an oblique insertion (as opposed to an excrescence perpendicular to the wall of the code shield that would not make it possible to hold the latter in its assembled position because of the flexibility of the lateral walls and of their tendency to tighten).

Reversible attachment means of dovetail type are a little more complex to produce that those of the keyhole type of the first embodiment but they make it possible to support greater loads and the prismatic faces enable better positioning of the assembly.

FIG. 7a presents the portion of the outer face of the lateral wall 10a of a code shield according to this second embodiment having first reversible attachment means 101.

FIG. 7b presents the same portion of the lateral wall 10a of a code shield according to this second embodiment, bottom view and of the outside of this lateral wall 10a, that is to say the portion that fits the lateral wall of the receiving location of the electronic payment terminal. This [FIG. 7b] makes it possible to view the oblique orientation of the first reversible attachment means 101 in relation to the lateral wall 10a.

Figures [FIG. 8a] and [FIG. 8b] illustrate two transparent views of a portion of a code shield assembled to an electronic payment terminal, according to this second embodiment, respectively of the outside of the assembly and of the inside of the assembly.

In these two views, only the first reversible attachment means 101 are represented, close to the function key TF1 of the keypad of the electronic payment terminal, this key also being represented in [FIG. 1] in order to better understand the view point of [FIG. 8*a*]. Indeed, a portion of the outer face of the lateral wall 10*a* of the code shield is illustrated in this [FIG. 8*a*].

Thus, in [FIG. 8*a*], the first reversible attachment means 101 are inserted into the corresponding receiving means 111 of the lateral wall 11*a* of the electronic payment terminal, as in Figure [FIG. 8*b*] (view of a portion of the inner face of the lateral wall 10*a*). As indicated above in relation with the first embodiment, any shape of the second reversible attachment means may be envisaged from the moment it enables the longitudinal holding of the code shield in assembled position, while enabling the insertion of the first reversible attachment means in the corresponding locations. As already described above, [FIG. 10*a*], [FIG. 10*b*] and [FIG. 10*c*] illustrate a plurality of views of these second reversible attachment means 102 according to another alternative embodiment. According to this alternative, this concerns triangular-shaped lugs. This shape of the second reversible attachment means 102 is compatible with all of the shapes of the first reversible attachment means, and vice versa.

Finally, for this second embodiment, the principle for removing the code shield is the same as for the first embodiment described above: a lateral pressure should be exerted on the rear portion of the code shield, in such a way as to make the attachment means 102 come out of the corresponding receiving means 112, as well as the attachment means 101 come out of the corresponding receiving means 111, and the code shield should be slid forwards. The combination of this lateral pressure and of this movement also makes it possible, according to this second embodiment, to reduce the risks of untimely dismantling.

Figure 9:
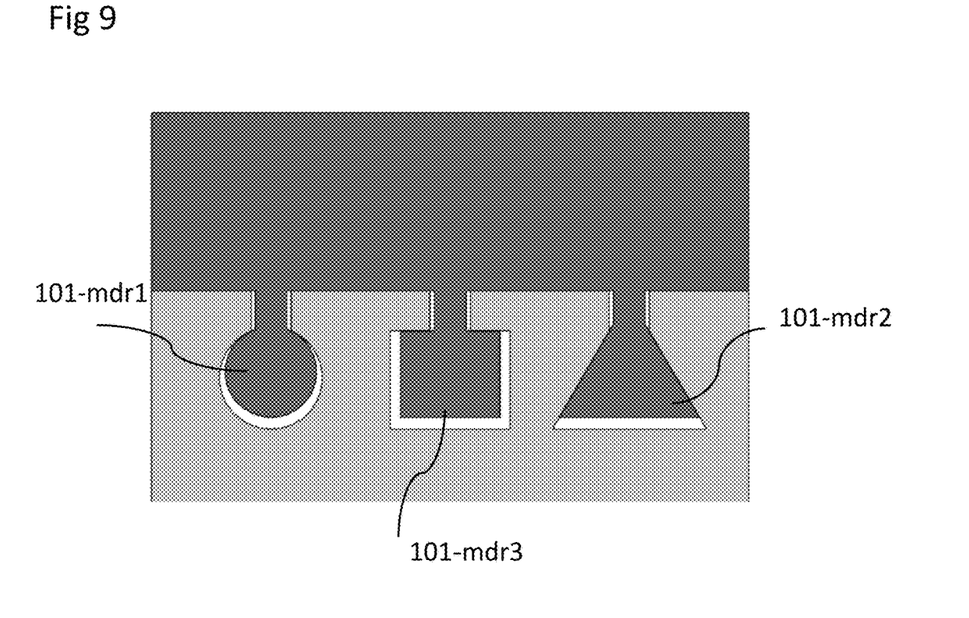
FIG. 9 illustrates three examples of shape of first reversible attachment means.

Other shapes may be implemented for the first reversible attachment means 101, such as a T-shape, illustrated in [FIG. 9], in which are illustrated three examples of shape of first reversible attachment means 101: the keyhole type shape 101-mdr1, described in relation with the first embodiment, the dovetail type shape 101-mdr2, described in relation with the second embodiment, and the T-shape 101-mdr3. This last shape is easier to produce than the dovetail type shape and makes it possible to correctly support the loads but does not provide recentering like the dovetail type shape.

As already indicated repeatedly, the principle remains the same: the first reversible attachment means 101 must have a bulge in such a way as to remain inserted in the receiving location receiving them.

The invention claimed is:

1. A removable code shield to be assembled in a reversible manner on an electronic payment terminal, the removable code shield comprising:
   at least one lateral wall;
   a rear wall; and
   first and second reversible attachments on an outer face of said at least one lateral wall which are configured to cooperate with corresponding receivers in a receiving location of said electronic payment terminal, said first reversible attachment being formed by at least one excrescence extending obliquely in relation to a plane of said outer face of said lateral wall, wherein the second attachment has a different shape than the first attachment.

2. The removable code shield according to claim 1, wherein said second reversible attachment is formed by at least one excrescence extending perpendicular to said plane of said outer face of said lateral wall.

3. The removable code shield according to claim 1, wherein the at least one lateral wall comprises two lateral walls each having said first and second reversible attachments.

4. The removable cache code shield according to claim 1, wherein said excrescence forming said first reversible attachment has a shape belonging to the group consisting of:
   dovetail,
   keyhole,
   T-shape.

5. An electronic payment terminal comprising:
   a keypad; and
   a receiving location for receiving a code shield that includes:
   at least one lateral wall;
   a rear wall; and
   first and second reversible attachments on an outer face of said at least one lateral wall which are configured to cooperate with corresponding first and second receivers in the receiving location of said electronic payment terminal, said first reversible attachment being formed by at least one excrescence extending obliquely in relation to a plane of said outer face of said lateral wall, wherein the second attachment has a different shape than the first attachment,
   said receiving location comprising at least one lateral wall and a rear wall surrounding said keypad on at least two of the keypad's sides, said at least one lateral wall of the receiving location having an inner face comprising the first receiver, which cooperates with said first reversible attachment of said code shield and the second receiver, which cooperates with said second reversible attachment of said code shield.

6. The electronic payment terminal according to claim 5, wherein said first receiver is formed by a cavity having a shape belonging to the group consisting of:
   dovetail,
   keyhole,
   T-shape.

7. A removable code shield to be assembled in a reversible manner on an electronic payment terminal, the removable code shield comprising:
   at least one lateral wall;
   a rear wall; and
   first and second reversible attachments on an outer face of said at least one lateral wall which are configured to cooperate with corresponding receivers in a receiving location of said electronic payment terminal, said first reversible attachment being formed by at least one excrescence extending obliquely in relation to a plane of said outer face of said lateral wall, and said second reversible attachment being formed by at least one excrescence extending perpendicular to said plane of said outer face of said lateral wall.

8. An electronic payment terminal comprising:
   a keypad; and
   a receiving location for receiving a code shield that includes:
   at least one lateral wall;
   a rear wall; and
   first and second reversible attachments on an outer face of said at least one lateral wall which are configured to cooperate with corresponding first and second receivers in the receiving location of said electronic payment terminal, said first reversible attachment being formed by at least one excrescence extending obliquely in relation to a plane of said outer face of said lateral wall, and said second reversible attachment being formed by at least one excrescence extending perpendicular to said plane of said outer face of said lateral wall, said receiving location comprising at least one lateral wall and a rear wall surrounding said keypad on at least two of the keypad's sides, said at least one lateral wall of the receiving location having an inner face comprising the first receiver, which cooperates with said first reversible attachment of said code shield and the second receiver, which cooperates with said second reversible attachment of said code shield.

\* \* \* \* \*